July 5, 1955
G. L. KITSON ET AL
2,712,379
CONDUIT CORNER MEMBERS
Filed Nov. 30, 1949
2 Sheets-Sheet 1
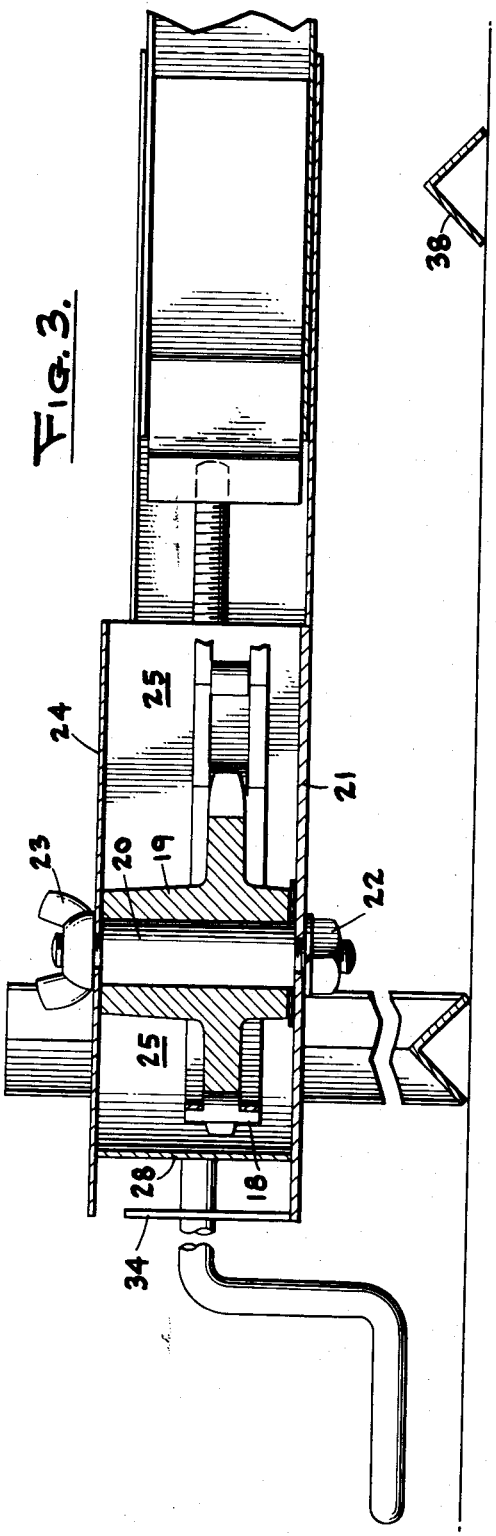
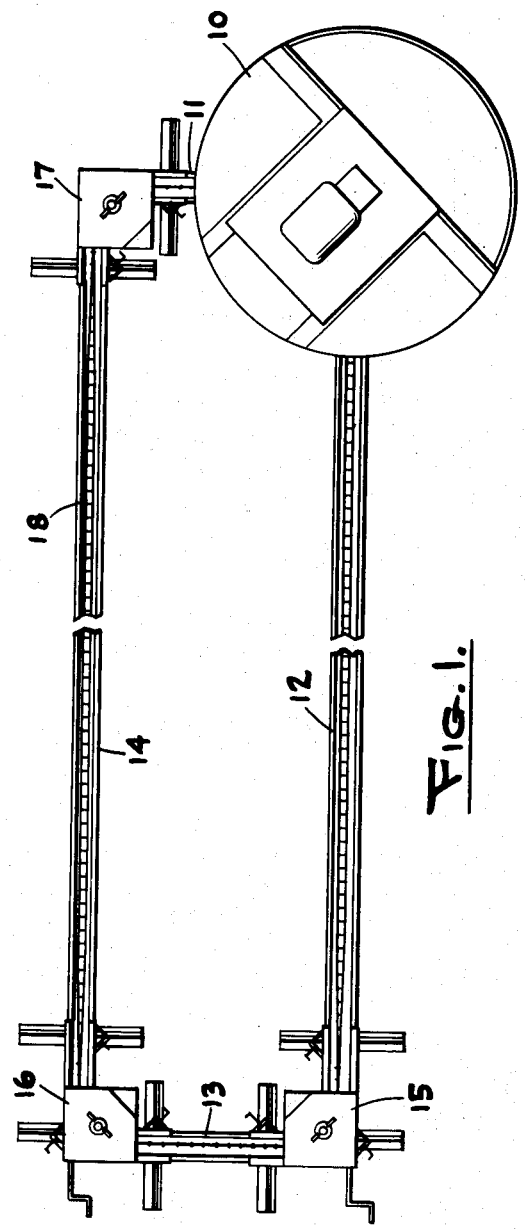
INVENTORS
GERALD L. KITSON
BLAINE K. STEVENS
BY
ATTORNEY

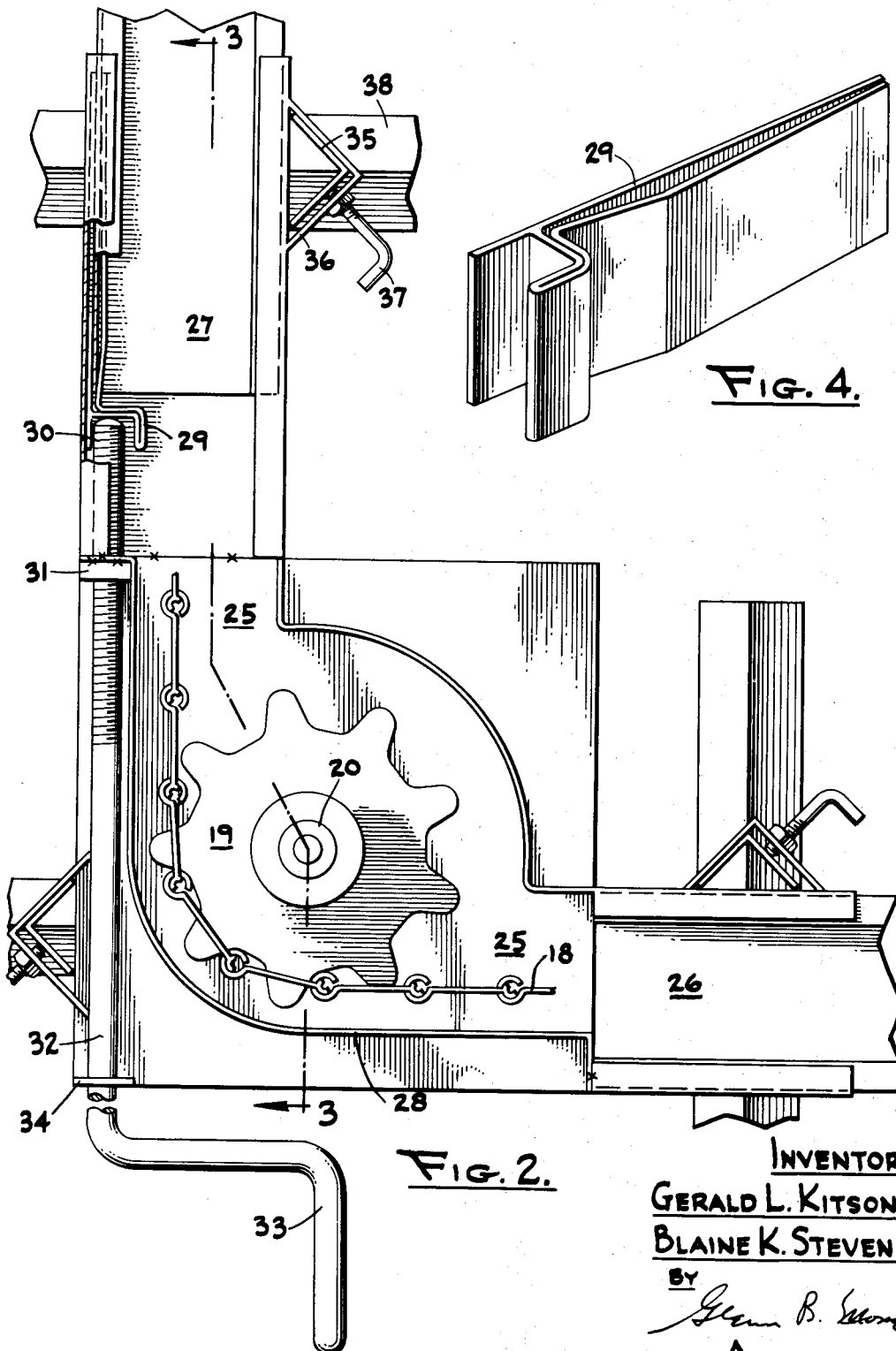

ained in engagement therewith by the action of the nut 22 which cooperates with suitable threads upon the lower end of the spindle. The sprocket is retained in position upon the spindle at the opposite end by the action of the wing nut 23 which cooperates with a similarly threaded end. Interposed between the nut 23 and the spindle, the cover plate 24 is likewise secured without the necessity of special supporting structure in this area.

United States Patent Office 2,712,379
Patented July 5, 1955

2,712,379
CONDUIT CORNER MEMBERS

Gerald L. Kitson, Rockford, and Blaine K. Stevens, Grand Rapids, Mich.

Application November 30, 1949, Serial No. 130,151

2 Claims. (Cl. 198—208)

The present invention is associated with automatic stock-feeding equipment. In Patent No. 2,589,706, the broad aspects of a stock-feeding machine are shown and described. The principal components of such a machine include a feed-supply hopper, a feed conduit, and an endless flexible distributing member dragging along the bottom of the conduit. At least a portion of the conduit is formed as an open-top horizontal trough giving access to the feed. The present application is principally concerned with the trough junctions at the corners of the feed conduit. In addition to providing a small section of conduit for the feed at the corners for cooperation with the ends of the trough, means also are provided by the present invention for adjusting the tension of the flexible distributing means shown and described in the above noted application.

In the preferred form of the chain-tightening system, an attachment is provided for the ends of the sheet metal trough in order to establish a rigid abutment surface of substantial area for cooperation with an adjustable stop. The corner mechanism is adapted to receive a section of trough axially, and the amount of such axial engagement is controlled by the presence of the stop. The position of this stop may be manually varied by a crank. As the crank is rotated to cause the stop to move away from the central portion of the corner member, the net effect is to increase the length of conduit between two adjacent guiding sprockets. Such an adjustment will of course have the effect of tightening the chain. The installation or removal of the chain distributing member is of course considerably facilitated by first shortening the total length of conduit through permitting the trough sections to slide inwardly with respect to the corner members as far as is necessary.

A channel is provided by the corner member uniting the open ends of the trough sections with which it cooperates. The action of an automatic stock feeder of the type considered herein involves the supply of feed to a conduit from a suitable hopper, and the distribution of the feed in a substantially uniform depth throughout the length of suitable feed troughs forming a part of the conduit by means of a flexible distributing member dragging along the bottom. With the feed supplied usually at one point, it follows that the distributing member must be able to cause the feed to flow around whatever corner structure is used without building up the feed in that area to such a height as to overflow the sides of the trough. It is preferable to mount a guiding sprocket in the corner members with the plane of the sprocket such that the chain is held reasonably close to the bottom of the trough to assure that the continuing movement of the distributing member will be brought to bear upon the feed without the necessity of creating an excessive depth therein at this point. It is also necessary that the feed be kept at such a location as to be in close contact with the distributing member to avoid the creation of stagnant piles of feed representing unused material.

To perform these functions, it has been found very desirable to arrange the feed channel of the corner member so that it closely approaches the outer diameter of the sprocket. In this manner, the distributing member urges the feed into the restricted area between the sprocket and the wall of the channel and is therefore able to move the feed around the corner without creating large stagnant areas or building up a quantity of material at an excessive depth.

Since the material of the trough is most conveniently formed of relatively thin sheet metal, the structure necessary in the corner member forms a very convenient place for the installation of supporting legs adapted to carry the weight of a section of the conduit system. These supporting legs are of course preferably adjustable along with the supporting means for the rest of the conduit system in order to adapt the trough to the correct height for the particular stock with which the machine is being used at the moment.

Preferably, the sprocket is supported in the corner member upon a spindle fastened to a base plate. The sprocket is assembled from above and is retained in position by a suitable nut upon the journal provided by this spindle. A cover plate substantially covering the channel portion of the corner member is provided in order to assure that the feed is not built up at any point to where a danger of overflow is created. This cover plate is preferably attached to the same spindle that supports the sprocket, and the cover may be removed by removing the nut that secures the sprocket against axial displacement along the spindle. In general, the structure of the corner member may be formed of cast material, but it has been found preferable to utilize the lightness in weight and general ruggedness of welded sheet metal for this purpose.

The various features of the subject invention will be discussed in detail by an analysis of the particular embodiments illustrated in the accompanying drawings. In these drawings, Figure 1 shows a general plan view layout of an automatic stock feed system of which the present invention is a part.

Figure 2 shows an enlarged view in plan of the corner system utilized at each of the corners (except where the hopper is located).

Figure 3 illustrates a section taken along the broken plane 3—3 of Figure 2.

Figure 4 is an enlarged perspective view showing the abutment attachment which is inserted on the end of the trough for cooperation with the adjustable stop.

Referring to Figure 1, an automatic stock feeder is shown having the supply hopper 10, and the straight sections of trough 11, 12, 13, and 14 forming the principal parts of a closed conduit. The remainder of the conduit is provided by the corner member (not shown) under the hopper 10 and by the other corner members 15, 16, and 17. The flexible distributing member 18 is shown as a plain chain having flat links, and it proceeds around a path determined by the sprockets carried by the various corner members.

Referring to Figures 2 and 3, an enlarged view is shown of a corner member such as is designated at 16 in Figure 1. The distributing member 18 passes around the sprocket 19 which is rotatably supported through the engagement of a reduced portion at the lower end with a suitable hole in the bottom plate 21 of the corner member, and is retained in engagement therewith by the action of the nut 22 which cooperates with suitable threads upon the lower end of the spindle. The sprocket is retained in position upon the spindle at the opposite end by the action of the wing nut 23 which cooperates with a similarly threaded end. Interposed between the nut 23 and the spindle, the cover plate 24 is likewise secured without the necessity of special supporting structure in this area.

A channel generally designated as 25 is provided by the corner member, and it has the function of uniting the ends 26 and 27 of the trough sections with which the corner member cooperates. The most active surface of the channel 25 is the wall 28 which closely follows the outline of the sprocket 19 and permits the distributing member 18 to urge the feed carried by the conduit around the corner and into the succeeding conduit section. It is preferable to position the plane of the sprocket 19 at a small distance above the bottom plate 21 in order to assure that the moving distributing member 18 is able to contact the supply of feed without the necessity of an excessive depth being accumulated.

In addition to the provision of a feed channel uniting the ends of the conduit sections, means are provided for tightening the chain of the entire feed-distributing system. Referring to Figure 2, it will be noted that an abutment attachment is provided for the ends of the trough, and this attachment is merely slipped over the ends as shown to provide an abutment surface for the adjustable stop 30. It is preferable to provide an enlarged surface for cooperation with the stop 30, since it is not practical to permit the relatively thin sheet metal to bear directly upon the stop. The adjustable stop is given an axial movement with respect to the trough through the engagement of the threaded exterior of the stop with a suitable threaded collar 31 which is fixed with respect to the corner member. The extended shaft 32 and the crank 33 permit the easy manual adjustment of the position of the stop, and the bearing support 34 lends the required rigidity to the extended shaft to permit the required forces to be applied. As the crank 33 is rotated to the right, (assuming a right hand thread is used) the stop portion 30 is moved upward as shown in Figure 2. Such movement causes the movement of the abutment attachment 29 and consequently causes the outward axial movement of the trough section with which it is associated. This movement has the effect of increasing the distance between the guiding sprocket associated with the illustrated corner member and that of the corner member disposed at the outer end (not shown) of the trough section indicated at 27.

The adjustable legs necessary to support the device are formed from pieces of angle iron as indicated at 35. These pieces 35 form the vertically disposed legs, and are slideably received within slightly larger pieces of angle iron 36 which are welded to the sides of the corner member. Clamping means to establish the vertical position of the legs 35, are provided by the set-screw 37. At the bottom of the legs 35, it is preferable to provide a footing member 38 to assure sufficient bearing on the ground to provide support for the weight of the structure involved.

The various embodiments of the present invention which have been illustrated in the accompanying drawings and described herein are for illustrative purposes only and are not to be considered as limitations upon the scope of the appended claims. In these claims it is the intent of the inventors to claim the entire invention to which they are entitled in view of the prior art.

We claim:

1. In a conduit system having a plurality of trough sections connected in series, junction means for said trough sections comprising: means forming a junction conduit adapted at each end to receive the ends of said trough sections; first abutment means adjacent at least one end of said junction conduit and axially adjustable with respect thereto; and second abutment means, said second abutment means having a portion interposed between said first abutment means and the end of a trough section, and having a portion disposed adjacent a substantial length of a wall of said trough section to reinforce the same.

2. In a conduit system having a plurality of conduit sections connected in series, junction means for said conduit sections comprising: means forming a junction conduit adapted at each end to receive the ends of said conduit sections; first abutment means adjacent at least one end of said junction conduit and axially adjustable with respect thereto; and second abutment means, said second abutment means including a clip portion adapted to grasp a wall of said conduit section, and a flange portion disposed to bear against said first abutment means.

References Cited in the file of this patent

UNITED STATES PATENTS

| | | |
|---|---|---|
| 2,110,204 | Davis | Mar. 8, 1938 |
| 2,219,724 | Quick | Oct. 29, 1940 |
| 2,386,619 | Long | Oct. 9, 1945 |
| 2,658,605 | De Witt | Nov. 10, 1953 |

OTHER REFERENCES

"Automatic Poultry Feeder Plan," Progress Report No. 2, pages 4–10, September 1948, Penn. State Coll. School of Agri., State Coll., Pa.

"Redler Conveyor-Elevators" Catalog 140 (1940), pages 23, 24.